(12) United States Patent
Qiao et al.

(10) Patent No.: US 6,423,760 B1
(45) Date of Patent: Jul. 23, 2002

(54) FULLY VULCANIZED POWDERY RUBBER HAVING A CONTROLLABLE PARTICLE SIZE, PREPARATION AND USE THEREOF

(75) Inventors: Jinliang Qiao; Genshuan Wei; Xiaohong Zhang; Shijun Zhang; Jianming Gao; Wei Zhang; Yiqun Liu; Jiuqiang Li; Fengru Zhang; Renli Zhai; Jingbo Shao; Kunkai Yan; Hua Yin, all of Beijing (CN)

(73) Assignees: China Petro-Chemical Corporation; Beijing Research Institute of Chemical Industry, Sinopec, both of Beijing (CN)

( * ) Notice: Subject to any disclaimer, the term of this patent is extended or adjusted under 35 U.S.C. 154(b) by 0 days.

(21) Appl. No.: 09/702,038

(22) Filed: Oct. 30, 2000

(30) Foreign Application Priority Data

Dec. 3, 1999 (CN) .......................................... 99125530

(51) Int. Cl.⁷ ................................................. C08F 2/46
(52) U.S. Cl. ........................ 522/150; 522/151; 522/152; 522/153; 522/154; 522/155; 522/156; 522/157; 522/158; 522/159; 522/160; 522/161; 428/402
(58) Field of Search ............................... 522/120, 121, 522/153–161, 150, 151, 152; 428/402

(56) References Cited

U.S. PATENT DOCUMENTS

| | | | | |
|---|---|---|---|---|
| 3,084,115 A | * | 4/1963 | Smith et al. | 204/154 |
| 4,352,765 A | * | 10/1982 | Menk et al. | 264/22 |
| 4,742,142 A | | 5/1988 | Shimizu et al. | 528/15 |
| 4,743,670 A | | 5/1988 | Yoshida et al. | 528/15 |
| 4,749,765 A | | 6/1988 | Shimizu et al. | 528/15 |
| 5,082,732 A | | 1/1992 | Ueda et al. | 428/402 |
| 5,538,793 A | | 7/1996 | Inokuchi et al. | 428/407 |
| 5,837,793 A | | 11/1998 | Harashima et al. | 528/29 |

* cited by examiner

*Primary Examiner*—James J. Seidleck
*Assistant Examiner*—Sanza L. McClendon
(74) *Attorney, Agent, or Firm*—Ladas & Parry

(57) ABSTRACT

The present invention provides a fully vulcanized powdery rubber having a particle size of from 20 to 2000 nm, its preparation and use. The vulcanized powdery rubber is obtained by irradiating a rubber latex having a particle size of from 20 to 2000 nm with a high-energy irradiation. The vulcanized powdery rubber is very easily to be dispersed into various plastics, and thus can be mixed with various plastics to prepare toughened plastics and fully valcanized thermoplastic elastomers.

27 Claims, 2 Drawing Sheets

FULLY VULCANIZED POWDERY RUBBER HAVING A CONTROLLABLE PARTICLE SIZE, PREPARATION AND USE THEREOF

The present invention relates to a powdery rubber, more particularly, to a fully vulcanized powdery rubber having a controllable particle size, which can be in the order of nm, a process for preparation of and use of the powdery rubber.

It is well known that rubbers can be in the form of blocks, rods, powders, pellets, sheets or the like, and rubbers can be classified as vulcanized (including slightly vulcanized) and unvulcanized. The fully vulcanized powdery rubbers have hot been disclosed in literatures except the vulcanized powdery silicone rubber.

A lot of references disclosed the vulcanized powdery silicone rubber and preparation thereof. For example, U.S. Pat. No. 4,743,670 (May 10, 1988) disclosed a highly dispersed vulcanized powdery silicone rubber and preparation thereof. The powdery silicone rubber has a uniform particular shape and particle size, and a bulk resistance of greater than $10^{13}$ Ω·cm. The process for preparing the vulcanized powdery rubber comprises (1) preparing a dispersion of a heat-vulcanizable liquid silicone rubber composition in water at 0 to 25° C. in the presence of a surfactant, (2) dispersing the dispersion obtained in step (1) into a liquid at 50° C. or above to vulcanize the liquid silicone rubber composition into powders, and (3) separating the vulcanized powdery silicone rubber.

U.S. Pat. No. 4,742,142 (Apr. 6, 1987) disclosed a process for preparing a powdery silicone rubber which comprises heating a heat-vulcanizable composition with a liquid at 0 to 25° C., emulsifying the composition into water containing a surfactant, and then spraying the emulsion into a water bath at 25° C. or above to sufficiently vulcanize the components in the silicone rubber composition.

U.S. Pat. No. 4,749,765 (Jun. 7, 1988) disclosed a process for preparing a powdery silicone rubber having a uniform particle size, which comprises (1) mixing the components at −60 to 50° C. to prepare a liquid silicone rubber composition, (2) spraying the liquid silicone rubber composition into hot air at 80 to 200° C. to form particles, (3) vulcanizing the particles, and (4) recovering the result powdery silicone rubber.

U.S. Pat. No. 5,837,739 (Nov. 17, 1998) disclosed a vulcanized powdery silicone rubber and preparation thereof. The powdery silicone rubber has a high hydrophilicity and softness, and an average particle size of less than 500 micron. The process for preparing the powdery silicone rubber comprises (1) vulcanizing a vulcanizable silicone composition comprising a specific organopolysiloxane to form a vulcanized silicone rubber, and (2) drying the vulcanized silicone rubber by spraying. The vulcanization reaction to form the vulcanized silicone rubber can be addition reaction between the alkenyl groups and the silicon-bonded hydrogen atoms, condensation between the silicon-bonded hydroxyls and the silicon-bonded hydrogen atoms, reaction induced by an organo peroxide or UV rays.

Although vulcanized powdery silicone rubbers obtained by chemical cross-linking and preparation thereof were disclosed in the prior art, there have been no report on other fully vulcanized powdery rubber up to now.

The present inventors find after a long time and extensive research that a fully vulcanized powdery rubber can be obtained by irradiating a rubber latex and drying. The fully vulcanized powdery rubber obtained has a uniform and controllable particle size, which is substantially the same as the particle size of the rubber particles in the latex. The fully vulcanized powdery rubber can be used to produce roughened plastics and fully vulcanized thermoplastic elastomers, has a promising prospect and great economical significance.

Therefore, one object of the present invention is to provide a fully vulcanized powdery rubber.

Another object of the present invention is to provide a process for preparing the fully vulcanized powdery rubber.

Yet another object of the present invention is to provide a composition usable to produce toughened plastics and thermoplastic elastomers, which comprises the present fully vulcanized powdery rubber and a plastic.

Still another object of the present invention is to provide the use of the fully vulcanized powdery rubber for toughening plastics or preparing thermoplastic elastomers.

The present fully vulcanized powdery rubber is particulate rubber which has a gel content of 60% by weight or more, and is free-flowing without the need of a partitioning agent. The gel content is a common parameter well-known in the art to characterize the cross-linking degree of a rubber, and can be determined by a well-known method in the art. The present fully vulcanized powdery rubber has a gel content of at least 60% by weight, preferably at least 75% by weight, and most preferably at least 90% by weight. Additionally, the swell index is another common parameter to characterize the cross-linking degree of a rubber, and can be determined by a well-known method in the art. The present fully vulcanized powdery rubber has a swell index of not greater than 15, preferably not greater than 13. Furthermore, the present fully vulcanized powdery rubber is a free-flowing particulate rubber, and the free-flowing property can be achieved without the addition of a partitioning agent. Therefore, a partitioning agent is not necessary to be added into the present fully vulcanized powdery rubber. However, if desired, a partitioning agent can be added into the present fully vulcanized powdery rubber to improve further the free-flowing property and the anti-block property.

The present fully vulcanized powdery rubber has a controllable particle size, the average particle size is generally in the range of from 20 to 2000 nm, preferably from 30 to 1500 nm, and most preferably from 50 to 500 nm. In the context of the present application, the particle size is measured by Scanning Electron Microscopy (SEM).

In the present fully vulcanized powdery rubber, each particle is homogeneous, that is to say, the individual particle is uniform with respect to the composition, and a heterogeneous phenomenon, such as lamellar phase and phase-separation, etc., within the particles is not detectable with microscopy available nowadays.

There is no restriction on the kinds of the rubber for the present fully vulcanized powdery rubber, it can be any kind of rubber except silicone rubber vulcanized by chemical cross-linking method. The illustrative example thereof is natural rubber, styrene-butadiene rubber, carboxylated styrene-butadiene rubber, nitrile rubber, carboxylated nitrile rubber, chloroprene rubber, polybutadiene, acrylic rubber, butadiene-styrene-vinylpyridine rubber, isoprene rubber, butyl rubber, ethylene-propylene rubber, polysulfide rubber, acrylate-butadiene rubber, urethane rubber, or fluorine rubber.

The present fully vulcanized powdery rubber can be obtained by vulcanizing the corresponding rubber latex with irradiation. For example, the present fully vulcanized powdery rubber can be prepared by irradiating a rubber latex with a particle size in the range of from 20 to 2000 nm, which is market available or prepared by the inventors, in the presence or absence of a cross-linking agent, with a high-energy irradiation, to vulcanize it fully. The high-energy irradiation can be selected from gamma-rays, X-rays, UV rays, and high-energy electron beams, preferably gamma-rays. The irradiation dose can be 0.1 to 30 megarads, preferably 0.5 to 20 megarads. The fully vulcanized powdery rubber having a particle size which is substantially the same as the size of the rubber particles in the latex is obtained by drying the irradiated latex. The drying can be carried out in a spray dryer or by precipitation drying method. If the drying is carried out in a spray dryer, the inlet temperature can be controlled at 100 to 200° C., and the outlet temperature at 20 to 80° C.

In the present invention, there is no restriction on the rubber latex as starting material, and it can be selected from natural rubber latex, styrene-butadiene rubber latex, carboxylated styrene-butadiene rubber latex, nitrile rubber latex, carboxylated nitrite rubber latex, chloroprene rubber latex, polybutadiene rubber latex, acrylic rubber latex, butadiene-styrene-vinylpyridine rubber latex, isoprene rubber latex, butyl rubber latex, ethylene-propylene rubber latex, polysulfide rubber latex, acrylate-butadiene rubber latex, urethane rubber latex, and fluorine rubber latex. The particle size of the rubber latex can be varied dependent on different use. There is no restriction on the solid content of the rubber latex, and the solid content is generally 20 to 70% by weight, preferably 30 to 60% by weight, more preferably 40 to 50% by weight.

A cross-linking agent is optionally used in the preparation of the present fully vulcanized powdery rubber. The suitable cross-linking agent can be mono-, di-, tri-, tetra- or multi-functional cross-linking agent, and any combination thereof. Examples of the monofunctional cross-linking agent include, but not limited to, octyl (meth)acrylate, iso-octyl (meth)acrylate, glycidyl (meth)acrylate; examples of the difunctional cross-linking agent include, but not limited to, 1,4-butandiol di(meth)acrylate, 1,6-hexandiol di(meth) acrylate, diglycol di(meth)acrylate, triglycol di(meth) acrylate, neopentylglycol di(meth)acrylate, divinyl benzene; examples of the triftinctionial cross-linking agent include, but not limited to, trimethylol propane tri(meth)acrylate, pentaerythritol tri(meth)acrylate; examples of the tetrafunctional cross-linking agent include, but not limited to, pentaerythritol tetra(meth)acrylate, ethoxylated pentaerythritol tetra(meth)acrylate; examples of the multifunctional cross-linking agent include, but not limited to, di-pentaerythritol penta(meth)acrylate. In the context of the present application, the term "(meth)acrylate" means acrylate or methacrylate.

The above-mentioned cross-linking agent can be used alone or in any combination, as long as it facilitates the vulcanization under irradiation.

The amount of the cross-linking agent varies depending upon the kinds and formulation of the rubber latex, and generally is 0.1 to 10% by weight, preferably 0.5 to 9% by weight, more preferably 0.7 to 7% by weight, based on the neat weight of the rubber.

The high-energy irradiation used in the present invention is the conventional gamma-rays, X-rays, UV rays, or high-energy electron beams, preferably gamma-rays. The irradiation dose depends on the kinds and formulation of the rubber latex, and can be in the range of from 0.1 to 30 megarads, preferably from 0.5 to 20 megarads. In general, the irradiation dose shall be such that the fully vulcanized rubber obtained by irradiating the rubber latex has a gel content of at least 60% by weight, preferably at least 75%, more preferably at least 90% by weight.

The present fully vulcanized powdery rubber is very easy to be dispersed into plastics, and thus can be mixed with various plastics to prepare various toughened plastics and fully vulcanized thermoplastic elastomers. The preparation comprises mixing, under the conventional conditions, together a specific ratio of the present fully vulcanized powdery rubber and a plastics in a conventional mixing device, if required, appropriate amount of processing aid and compatibilizer can be added.

In preparing the toughened plastics, the weight ratio of the present fully vulcanized powdery rubber and the plastic is 0.5:99.5 to 50:50, preferably 1:99 to 30:70. The plastics to be toughed can be Nylon, polypropylene, polyethylene, polyvinyl chloride, polyurethane, epoxy resin, polyester, polycarbonate, polyoxymethylene, polystyrene, polyphenylene oxide (PPO), polyphenylene sulfide (PPS), polyimide, polysulfone, and copolymer and blends thereof.

In preparing the fully vulcanized thermoplastic elastomers, the weight ratio of the present fully vulcanized powdery rubber and the plastic is 30:70 to 75:25, preferably 50:50 to 70:30. The suitable plastics is Nylon, polypropylene, polyethylene, polyvinyl chloride, polyurethane, epoxy resin, polyester, polycarbonate, polyoxymethylene, polystyrene, polyphenylene oxide (PPO), polyphenylene sulfide (PPS), polyimide, polysulfone, and copolymer and blends thereof.

The present invention is further illustrated in the following by way of the Examples in conjunction with the Figures, which shall not be understood to limit the scope of the invention as defined in the claims.

Figure 1:
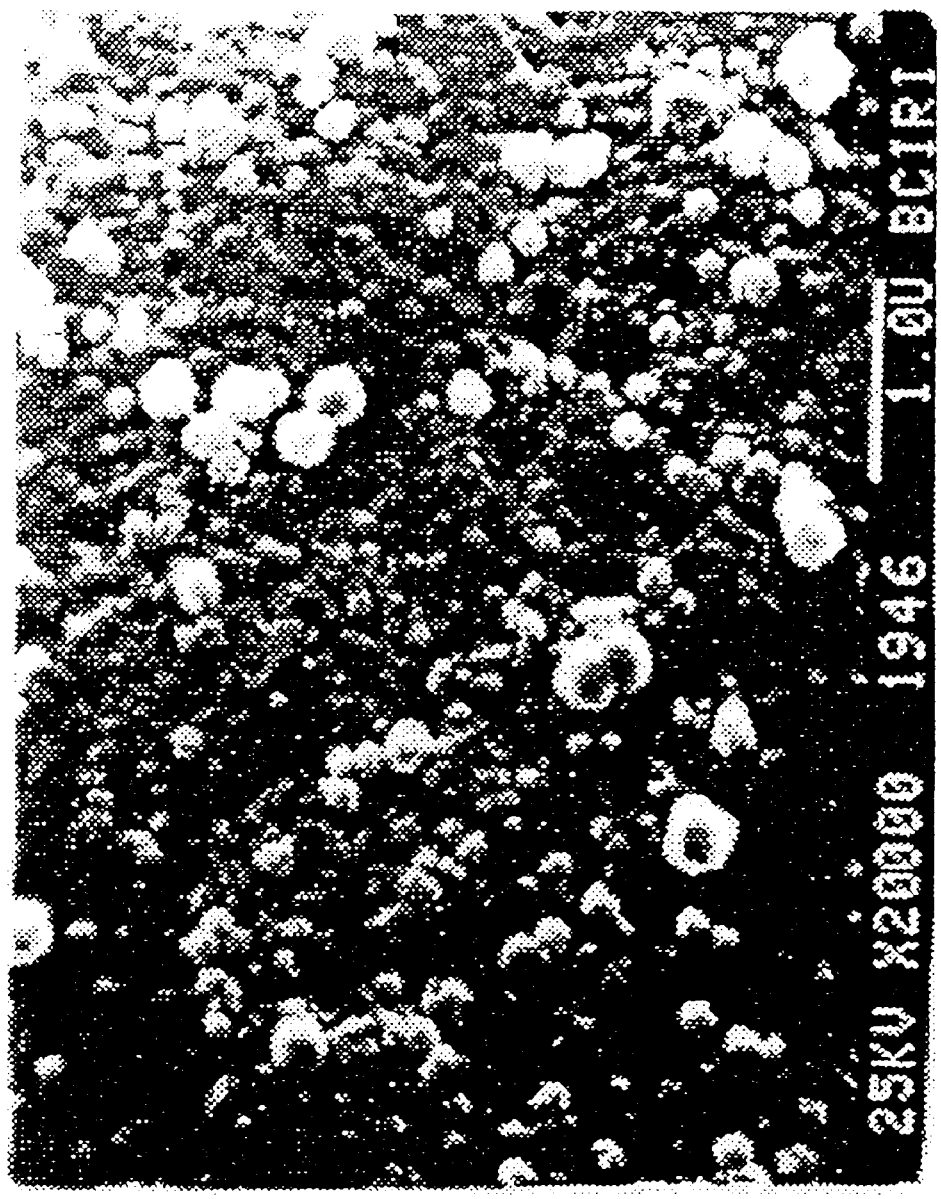
FIG. 1 is the scanning electron micrograph of the fully vulcanized powdery carboxylaited butadiene-styrene rubber obtained in Example 4 magnified by 20,000 times.

In the following Examples, the gel content is determined according to the following procedure: weigh accurately about 0.1 gram of the fully vulcanized powdery rubber $W_0$ obtained by spray drying, wrap it with conventional lens paper, and then wrap it in a copper screen cloth of 200 mesh, and weigh the copper screen together with its contents accurately, $W_1$. Next, place the screen cloth and its contents in boiling toluene until the weight of the copper screen and its contents after being dried sufficiently is substantially constant, usually for about 6 hours. Then, the boiled copper screen cloth and its contents are dried fully, and weigh accurately, $W_2$. The gel content is calculated according to the following formula:

$$\text{Gel content } (\%) = [W_0 - (W_1 - W_2)]/W_0 \times 100\%$$

wherein $W_0$ represents the weight of the sample of the fully vulcanized powdery rubber;

$W_1$ represents the weight of the copper screen cloth and its contents before being boiled; and $W_2$ represents the weight of the copper screen cloth and its contents after being boiled and dried sufficiently.

The swell index is determined according to the following procedure: the irradiated rubber latex is dried to form a film (if it is difficult to form film, use the dried powder directly). A small box weighing $W_0$ and made of copper screen cloth of 200 mesh is immersed into toluene for a moment, and then is taken out and at once weighed, recorded as $W_1$. About 0.1 gram of film or powder is weighed into the box, the box and the film or powder therein are immersed in toluene for 24 hours at room temperature. Thereafter, the box and the swelled film or powder, i.e. the gel are taken out carefully, and the solvent on the surface of the gel is suctioned off, and then weigh quickly the box and the gel, recorded as $W_2$. Then, the box and the gel are dried fully to a constant weight $W_3$. The swell index is calculated according to the following formula:

$$\text{Swell index} = (W2-W_1)/(W_3-W_0)$$

EXAMPLE 1

5 kg of market available carboxylated butadiene-styrene rubber latex having a solid content of 50% by weight (available from Yanshan Petrochemical Company, Designation: XSBRL-54B1) is placed in a container, 75 g of iso-octyl acrylate is added dropwise while stirring. The stirring is continued for 1 hour after the addition is complete. Thereafter, the rubber latex is irradiated with a cobalt-60, with the irradiation dose being 2.5 megarads and the irradiation dose rate being 50 Gy/min. The irradiated latex is dried with a spray dryer, with the inlet temperature being 140 to 160° C., and the outlet temperature being 40 to 60° C., the dried carboxylated butadiene-styrene rubber powder is recovered by a cyclone separator, and a free-flowinig powder sample 1 of the fully vulcanized carboxylated butadiene-styrene rubber is obtained. The particle size of the powdery rubber is measured to be about 150 nm, the gel content is 92.6%, and the swell index is 7.6.

EXAMPLE 2

The procedure in Example 1 is repeated except that the irradiation dose is changed to 10 megarads. A free-flowing powder sample 2 of the fully vulcanized carboxylated butadiene-styrene rubber is obtained. The particle size of the powdery rubber is measured to be about 150 nm, the gel content is 94.5%, and the swell index is 5.4.

EXAMPLE 3

The procedure in Example 1 is repeated except that the cross-linking agent is changed to diglycol diacrylate. A free-flowing powder sample 3 of the fully vulcanized carboxylated butadiene-styrene rubber is obtained. The particle size of the powdery rubber is measured to be about 150 nm, the gel content is 93.0%, and the swell index is 7.3.

EXAMPLE 4

The procedure in Example 1 is repeated except that the cross-linking agent is changed to trimethylol propane triacrylate. A free-flowing powder sample 4 of the fully vulcanized carboxylated butadiene-styrene rubber is obtained. The particle size of the powdery rubber is measured to be about 150 nm (see FIG. 1), the gel content is 93.3%, and the swell index is 5.8.

EXAMPLE 5

5 kg of market available butadiene-styrene rubber latex with a solid content of 45% by weight (available from Lanzhou Petrochemical Company, Designation: Dingben-50) is placed in a container, 67.5 g of iso-octyl acrylate is added dropwise while stirring. The stirring is continued for 1 hour after the addition is complete. Thereafter, the rubber latex is irradiated with a cobalt-60, with the irradiation dose being 2.5 megarads and the irradiation dose rate being 50 Gy/min. The irradiated latex is dried with a spray dryer, with the inlet temperature being 140 to 160° C., and the outlet temperature being 40 to 60° C., the dried butadiene-styrene rubber powder is recovered by a cyclone separator, and a free-flowing powder sample 1 of the fully vulcanized butadiene-styrene rubber is obtained. The particle size of the powdery rubber is measured to be about 100 nm, the gel content is 90.0%, and the swell index is 12.9.

EXAMPLE 6

The procedure in Example 5 is repeated except that the cross-linking agent is changed to trimethylol propane triacrylate. A free-flowing powder sample 2 of the fully vulcanized butadiene-styrene rubber is obtained. The particle size of the powdery rubber is measured to be about 100 nm, the gel content is 90.4%, and the swell index is 11.6.

EXAMPLE 7

5 kg of market available carboxylated nitrile rubber latex with a solid content of 45% by weight (available from Lanzhou Petrochemical Company, Designation: Dingben-50) is placed in a container, 67.5 g of iso-octyl acrylate is added dropwise while stirring. The stirring is continued for 1 hour after the addition is complete. Thereafter, the rubber latex is irradiated with a cobalt-60, with the irradiation dose being 2.5 megarads and the irradiation dose rate being 50 Gy/min. The irradiated latex is dried with a spray dryer, with the inlet temperature being 140 to 160° C., and the outlet temperature being 40 to 60° C., the dried carboxylated nitrile rubber powder is recovered by a cyclone separator, and a free-flowing powder sample 1 of the fully vulcanized carboxylated nitrile rubber is obtained. The particle size of the powdery rubber is measured to be about 50 nm, the gel content is 96.1%, and the swell index is 7.5.

EXAMPLE 8

The procedure in Example 7 is repeated except that the cross-linking agent is changed to trimethylol propane triacrylate. A free-flowing powder sample 2 of the fully vulcanized carboxylated nitrile rubber is obtained. The particle size of the powdery rubber is measured to be about 50 nm, the gel content is 97.1%, and the swell index is 6.7.

EXAMPLE 9

5 kg of market available butyl acrylate rubber latex with a solid content of 48% by weight (available from Beijing Dongfang Chemicals, Designation: BC-01) is placed in a container, 72 g of iso-octyl acrylate is added dropwise while stirring. The stirring is continued for 1 hour after the addition is complete. Thereafter, the rubber latex is irradiated with a cobalt-60, with the irradiation dose being 2.5 megarads and the irradiation dose rate being 50 Gy/min. The irradiated latex is dried with a spray dryer, with the inlet temperature being 140 to 160° C., and the outlet temperature being 40 to 50° C., the dried butyl acrylate rubber powder is recovered by a cyclone separator, and a free-flowing powder sample 1 of the fully vulcanized butyl acrylate rubber is obtained. The particle size of the powdery rubber is measured to be about 100 nm, the gel content is 85.7%, and the swell index is 12.2.

EXAMPLE 10

The procedure in Example 9 is repeated except that the cross-linking agent is changed to trimethylol propane triacrylate. A free-flowing powder sample 2 of the fully vulcanized butyl acrylate rubber is obtained. The particle size of the powdery rubber is measured to be about 100 nm, the gel content is 87.7%, and the swell index is 11.0.

EXAMPLE 11

5 kg of natural rubber latex with a solid content of 60% by weight (available from Beijing Latex Manufacturer) is placed in a container, 150 g of trimethylol propane triacrylate is added dropwise while stirring. The stirring is continued for 1 hour after the addition is complete. Thereafter, the rubber latex is irradiated with a cobalt-60, with the irradiation dose being 15 megarads and the irradiation dose rate being 50 Gy/min. The irradiated latex is dried with a spray dryer, with the inlet temperature being 140 to 160° C., and the outlet temperature being 40 to 50° C., the dried natural rubber powder is recovered by a cyclone separator, and a free-flowing powder sample 1 of the fully vulcanized natural rubber is obtained. The particle size of the powdery rubber is measured to be about 500 nm, the gel content is 94.1%, and the swell index is 12.8.

EXAMPLE 12

The powder sample 1 of the fully vulcanized carboxylated butadiene-styrene rubber (obtained in Example 1) and Nylon-6 (Designation: 1013B, manufactured by UBE Industries, Ltd., Japan) are blended and palletized at ratio of 75:25 in a ZSK-25 twin screw extruder (WP Company, Germany), the temperature of the individual section of the extruder is set at 210, 225, 225, 225, 230, and 225° C. (extruder head), respectively. The obtained pellets are, respectively, compressed and injection molded into standard sheet specimen. The properties of the fully vulcanized butadiene-styrene rubber/Nylon-6 thermoplastic elastomer tested on these specimen are summarized in Table 1 below.

EXAMPLE 13

Figure 2:
FIG. 2 is the atomic force micrograph of the sample obtained in Example 14 magnified by 40,000 times.

The powder sample of the fully vulcanized natural rubber (obtained in Example 11) and the high density polyethylene resin (Designation: J-1, manufactured by the Second Beijing Agents Manufacturer) are blended at ratio of 75:25 in a Brabender kneader for 2 minutes, the temperature of oil bath for the kneader is set at 160° C. The obtained material is compressed into sheet by a twin roll mill (temperature: 160° C.), to prepare the standard specimen. The properties of the fully vulcanized natural rubber/polyethylene thermoplastic elastomer tested on these specimen are summarized in Table 1 below.

individual section of the extruder is set at 230, 235, 240, 245, 240, and 235° C., respectively. After being dried in an oven, the obtained pellets are injection molded into standard sheet specimen. The properties of the ultra-toughened Nylon-6 measured according to the ASTM test methods are summarized in Table 2 below. The particle distribution graph obtained by the atomic force micrography is shown if FIG. 2 (the particle size of the rubber particles in the dispersion phase is 150 nm).

Comparative Example 1

The Nylon-6 used in Example 14 is injection-molded directed into the standard specimen, and the property test results are summarized in Table 2 below.

EXAMPLE 15

To polyoxymethylene (Designation: 4520, manufactured by Asahi Kasei Kogyo K.K., Japan) is added 28% of the Powder sample 1 of the fully vulcanized carboxylated butadiene-styrene rubber (obtained in Example 1), 1.2% of calcium stearate, 0.6% of finely divided steatite powder, 0.3% of polyethylene wax and 0.4% of antioxidant IRGANOX™ 1010 (available from Ciba-Geigy), the resultant mixture is mixed at high speed (1500 rpm) for 3 minutes, and then is blended and palletized in a ZSK-25 twin screw extruder (WP Company, Germany), the temperature of the individual section of the extruder is set at 175, 180, 185, 185, 180, and 175° C., respectively. After being dried in an oven, the obtained pellets are injection molded into standard sheet specimen. The properties of the toughened polyoxymethylene measured according to the ASTM test methods are summarized in Table 2 below.

Comparative Example 2

The polyoxymethylene used in Example 15 is injection-molded directed into the standard specimen, and the property test results are summarized in Table 2 below.

TABLE 1

| Specimen | | Tensile strength (MPa) ASTM D412 | Elongation at break (%) ASTM D412 | Tension set (%) ASTM D412 | Tensile stress at 100% elongation (MPa) ASTM D412 | Shore hardness ASTM D2240–95 | Vicat softening point (° C.) ASTM D1525 |
|---|---|---|---|---|---|---|---|
| Example 12 | Compressed specimen | 17.0 | 175 | 61 | 11.8 | — | — |
| | Injection-molded specimen | 16.4 | 216 | 101 | 10.5 | 40 (Shore D) | 164.8 |
| Example 13 | Compressed specimen | 15.0 | 438 | 122 | — | 86 (Shore A) | — |

EXAMPLE 14

To Nylon-6 (Designation: 1013B, manufactured by UBE Industries, Ltd., Japan) is added 20%, of the Powder sample 1 of the fully vulcanized carboxylated butadiene-styrene rubber (obtained in Example 1), 0.6% of calcium stearate and 0.8% of finely divided steatite powder, the resultant mixture is mixed at high speed (1500 rpm) for 3 minutes, and then is blended and palletized in a ZSK-25 twin screw extruder (WP Company, Germany), the temperature of the

TABLE 2

| | Test Method | Comp. Ex. 1 | Ex. 14 | Comp. Ex. 2 | Ex. 15 |
|---|---|---|---|---|---|
| Tensile strength (MPa) | ASTM D638 | 72 | 51.5 | 62.2 | 47.2 |
| Elongation at break (%) | ASTM D638 | 60 | 175 | 30 | 215 |

TABLE 2-continued

|  | Test Method | Comp. Ex. 1 | Ex. 14 | Comp. Ex. 2 | Ex. 15 |
|---|---|---|---|---|---|
| Flexural strength (MPa) | ASTM D790 | 80.5 | 56.6 | 82.5 | 56.7 |
| Flexural modulus (GPa) | ASTM D790 | 2.2 | 1.72 | 2.34 | 1.65 |
| Izod impact strength (J/m) | ASTM D256 | 45 | 665 | 42 | 562 |
| HDT 1.82 MPa (° C.) 0.46 MPa | ASTM D648 | 68.5 | 61.8 | — | — |
|  |  | — | — | 161.5 | 142.8 |

We claim:

1. A fully vulcanized powdery rubber obtained by vulcanizing with irradiation having a gel content of 60% by weight or more and an average particle size of from 20 to 2,000 nm, with each of the particles present in the powdery rubber being homogeneous, said fully vulcanized powdery rubber not including powdery silicone rubber.

2. The fully vulcanized powdery rubber according to claim 1, wherein said powdery rubber has a gel content of 75% by weight or more.

3. The fully vulcanized powdery rubber according to claim 1, wherein said powdery rubber has a gel content of 90% by weight or more.

4. The fully vulcanized powdery rubber according to claim 1, wherein said powdery rubber has an average particle size of from 30 to 1,500 nm.

5. The fully vulcanized powdery rubber according to claim 1, wherein said powdery rubber has an average particle size of from 50 to 500 nm.

6. The fully vulcanized powdery rubber according to claim 1, wherein said rubber is selected from the group consisting of natural rubber, styrene-butadiene rubber, carboxylic styrene-butadiene rubber, nitrile rubber, carboxylic nitrile rubber, chloroprene rubber, polybutadiene, acrylic rubber, butadiene-styrene-vinylpyridine rubber, isoprene rubber, butyl rubber, ethylene-propylene rubber, polysulfide rubber, acrylate-butadiene rubber, urethane rubber, and fluorine rubber.

7. A process for preparing the fully vulcanized powdery rubber according to claim 1, comprising providing a rubber latex, optionally adding a cross-linking agent into the rubber latex, then applying irradiation to the rubber latex to form a cross-linked rubber latex and then drying the cross-linked rubber latex.

8. The process according to claim 7, wherein said irradiation is carried out by means of a high-energy source.

9. The process according to claim 7, wherein said high-energy source is selected from gamma-rays, X-rays, UV rays, and high-energy electron beams.

10. The process according to claim 9, wherein said high-energy source is gamma-rays.

11. The process according to claim 7, wherein said rubber latex is selected from the group consisting of natural rubber latex, styrene-butadiene rubber latex, carboxylic styrene-butadiene rubber latex, nitrile rubber latex, carboxylic nitrile rubber latex, chloroprene rubber latex, polybutadiene rubber latex, acrylic rubber latex, butadiene-styrene-vinylpyridine rubber latex, isoprene rubber latex, butyl rubber latex, ethylene-propylene rubber latex, polysulfide rubber latex, acrylate-butadiene rubber latex, urethane rubber latex, and fluorine rubber latex.

12. The process according to claim 7, wherein said rubber latex is irradiated in the presence of a cross-linking agent which is selected from the group consisting of monofunctional, difunctional, trifunctional, tetrafunctional and multi-functional cross-linking agent, and any combination thereof.

13. The process according to claim 12, wherein said cross-linking agent is selected from the group consisting of octyl (meth)acrylate, iso-octyl (meth)acrylate, glycidyl (meth)acrylate, 1,4-butandiol di(meth)acrylate, 1,6-hexandiol di(meth)acrylate, diglycol di(methyl)acrylate, triglycol di(meth)acrylate, neopentylglycol di(meth)acrylate, divinyl benzene, trimethylol propane tri(meth)acrylate, pentaerythritol tri(meth)acrylate, pentaerythritol tetra(meth)acrylate, ethoxylated pentaerythritol tetra(meth)acrylate; di-pentaerythritol penta(meth)acrylate and any combination thereof.

14. The process according to claim 7, wherein said drying is carried out in a spray dryer or by means of precipitation drying.

15. The process according to claim 14, wherein said drying is carried out in a spray dryer.

16. The process according to claim 7, wherein said irradiation dose is in the range of from 0.1 to 30 megarads.

17. The process according to claim 16, wherein said irradiation dose is in the range of from 0.5 to 20 megarads.

18. The process according to claim 12, wherein said amount of the cross-linking agent is present in an amount from 0.1 to 10% by weight based on the neat weight of the rubber.

19. The process according to claim 18, wherein said amount of the cross-linking agent ranges from 0.5 to 9% by weight based on the neat weight of the rubber.

20. The process according to claim 19, wherein said amount of cross-linking agent is from 0.7 to 7% by weight based on the neat weight of the rubber.

21. The process according to claim 20, wherein the spray dryer has an inlet temperature from 100 to 200° C., and an outlet temperature from 20 to 80° C.

22. A composition for preparing toughened plastics or thermoplastic elastomers, which comprises the fully vulcanized powdery rubber as claimed in claim 1 and a plastic.

23. A method for preparation of toughened plastics or thermoplastic elastomers, which comprises mixing said fully vulcanized powdery rubber of claim 1 with a plastic material.

24. A process for preparing a vulcanized rubber powder having a gel content of at least 60% and an average particle size of from 20–2000 nm, said process consisting essentially of the following steps in the following sequence:
   a) providing a rubber latex comprising rubber in the form of particles having an average particle size in a range of from 20 to 2000 nm,
   b) optionally adding a cross-linking agent to said rubber latex to form a rubber latex composition;
   c) irradiating the rubber latex composition to cause cross-linking of the rubber with formation of a particulate rubber having a gel content of at least 60% by weight;
   d) drying the irradiated rubber latex composition and obtaining the vulcanized rubber powder.

25. The process according to claim 24, wherein said rubber latex composition comprises a rubber latex selected from the group consisting of: natural rubber, styrene-butadiene rubber, carboxylic styrene-butadiene rubber, nitrile rubber, carboxylic nitfrile rubber, chloroprene rubber, polybutadiene, acrylic rubber, butadiene-styrene-vinylpyridine rubber, isoprene rubber, butyl rubber, ethylene-propylene rubber, polysulfide rubber, acrylate-butadiene rubber, urethane rubber, and fluorine rubber.

26. The process according to claim 25, wherein the irradiation in step (b) forms a particulate rubber having a gel content of at least 90% by weight.

27. A vulcanized rubber powder formed by the process of claim 25.

* * * * *